US009692529B1

(12) United States Patent
Music et al.

(10) Patent No.: US 9,692,529 B1
(45) Date of Patent: Jun. 27, 2017

(54) SYSTEM AND METHOD FOR SIGNAL EMITTER IDENTIFICATION USING HIGHER-ORDER CUMULANTS

(71) Applicant: Southwest Research Institute, San Antonio, TX (US)

(72) Inventors: Wayne D. Music, San Antonio, TX (US); Ryan N. Wilson, Melissa, TX (US); Brian K. Anderson, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 15/238,405

(22) Filed: Aug. 16, 2016

(51) Int. Cl.
  *H04B 17/00* (2015.01)
  *H04B 17/10* (2015.01)
  *G06F 17/17* (2006.01)

(52) U.S. Cl.
  CPC ........... *H04B 17/101* (2015.01); *G06F 17/17* (2013.01)

(58) Field of Classification Search
  CPC ............... H04B 17/336; H04B 1/7107; H04B 1/70735; H04B 17/27; H04B 17/101; H04B 17/345; G01S 3/74; G01S 5/0215; G01S 3/14; G06F 17/17; G06F 19/00; G06K 9/624; G06K 9/00523; G02B 21/16
  See application file for complete search history.

(56) References Cited

U.S. PATENT DOCUMENTS

| | | | | |
|---|---|---|---|---|
| 8,326,240 B1* | 12/2012 | Kadambe | ............... | H04B 17/27 455/114.2 |
| 8,392,149 B1* | 3/2013 | Spencer | ................... | G06K 9/38 702/193 |
| 2004/0204878 A1* | 10/2004 | Anderson | ............... | G06F 19/00 702/66 |
| 2010/0265139 A1* | 10/2010 | Beadle | ...................... | G01S 3/14 342/451 |
| 2014/0198198 A1* | 7/2014 | Geissbuehler | ......... | G02B 21/16 348/79 |

OTHER PUBLICATIONS

Hall, J., et al; "Detecting Rogue Devices in Bluetooth Networks Using Radio Frequency Fingerprinting"; Proceedings of 3rd IASTED Int'l. Conf. on Comm. and Computer Networks, pp. 108-113, (2006).

Hall, J., et al; "Detection of Transient in Radio Frequency Fingerprinting Using Signal Phase"; Proceedings of IASTED Int'l. Conf. on Wireless and Optical Communications, Banff, Alberta, (6 pgs) (2003).

(Continued)

*Primary Examiner* — Thanh Le
(74) *Attorney, Agent, or Firm* — Grossman, Tucker et al

(57) ABSTRACT

A system, method and computer program product for signal emitter identification using Higher-Order Cumulants (HOC) is presented. At least one transient signal is received from an emitter when the emitter turns on. The at least one transient signal is processed using at least one Higher-Order Cumulant (HOC) to provide a set of entries for a vector table. A feature vector is derived from the vector table, the feature vector identifying the emitter. The feature vector is used to identify an emitter.

20 Claims, 4 Drawing Sheets

(56) References Cited

OTHER PUBLICATIONS

Mendel, J. M.; "Tutorial on Higher-Order Statistics (Spectra) in Signal Processing and System Theory: Theoretical Results and Some Applications"; Proceeding of the IEEE, vol. 79, No. 3, pp. 278-305 (Mar. 1991).

Ruanaidh, J., et al; "Statistics and Computing, Numerical Bayesian Methods Applied to Signal Processing"; Springer Science & Business Media, LLC (cover page and table of contents provided—13 pgs).

Swami, A., "USC-SIPI Report #140, System Identification Using Cumulants" (USC Thesis Oct. 1988—228 pgs).

Ureten, O., et al; "Bayesian Detection of Wi-Fi Transmitter RF Fingerprints", IEEE Trans., Electronic Letters, vol. 41, No. 6 (Mar. 17, 2005) (2 pgs).

Zhou, X., et al; "Signal Classification Method Based on Support Vector Machine and High-Order Cumulants", Scientific Research Jrnl., Wireless Sensor Network, vol. 2, pp. 48-52 (2010).

* cited by examiner

SYSTEM AND METHOD FOR SIGNAL EMITTER IDENTIFICATION USING HIGHER-ORDER CUMULANTS

FIELD

The present disclosure is directed at a system and method for signal emitter identification utilizing higher order cumulants (HOC).

BACKGROUND

Identification of electromagnetic transmitters has long been a technical issue for various government and commercial entities. Sometimes locating the emitter assists in the identification process, but when an adversarial emitter is intermingled with friendly emitters, then additional identification techniques may be needed to determine whether the emitter is friend or foe, or whether it is legitimate or not. Specific Emitter Identification (SEI) and Signal-Of-Interest (SOI) determination is significant for both the defense and commercial industries in support of wireless spectrum management, cognitive radio networks, and the general security of wireless networks.

Many different types of signal processing methods have been employed for SEI. One method utilizes specific signal parameter estimation to allow for feature extraction that may identify the emitter. A different method utilizes statistical and cyclo-stationary parameter pattern recognition up through second-order statistics to distinguish different emitters from one another. Another method uses confusion matrices that may or may not be combined with feature extraction to identify the emitter's type of modulation as another parameter for a feature vector that may help distinguish one emitter from others. An alternative method employs capturing the emitter's various identification codes (typically temporary) such as its international mobile subscriber identity (IMSI). An additional method utilizes spectral analysis and waterfall displays. Still another method uses Radio Frequency (RF) fingerprinting. Some systems for the detection of malware in a computing device may employ signature-based detection. Such systems may also monitor the behavior or activity of applications on a computing device.

SUMMARY

When an emitter turns on, the signal goes through a transient state. The transient is caused by a combination of electronic physical effects. These effects are all different to some degree between emitters due to non-conformity of the electronic hardware. Consequently, these effects are unique between emitters and show up as differences in the available features for SEI. SEI based on the transient signal preferably utilizes two stages: detection of the transients and extraction of the RF fingerprint. Past work in RF fingerprinting of transients has been mainly focused on the amplitude, frequency, phase and the energy envelope.

Many of these methods are ad hoc and give insufficient data to perform identification other than the type of signal. Others such as an emitter's ID are now encrypted and require a secret key and decryption to get the ID. RF fingerprinting on the signal's transient are sensitive to noise and need different variables for transient detection and RF fingerprint extraction.

In a particular embodiment of a method for signal emitter identification using higher-order cumulants, the method includes receiving at least one transient signal from an emitter when the emitter turns on. The method further includes processing the at least one transient signal using at least one Higher-Order Cumulant (HOC) to provide a set of entries for a vector table. Additionally, the method involves deriving a feature vector from the vector table, the feature vector identifying the emitter. Additionally, the method involves utilizing the feature feature vector to then identify the emitter.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally every aspect of the present disclosure or claimed invention. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
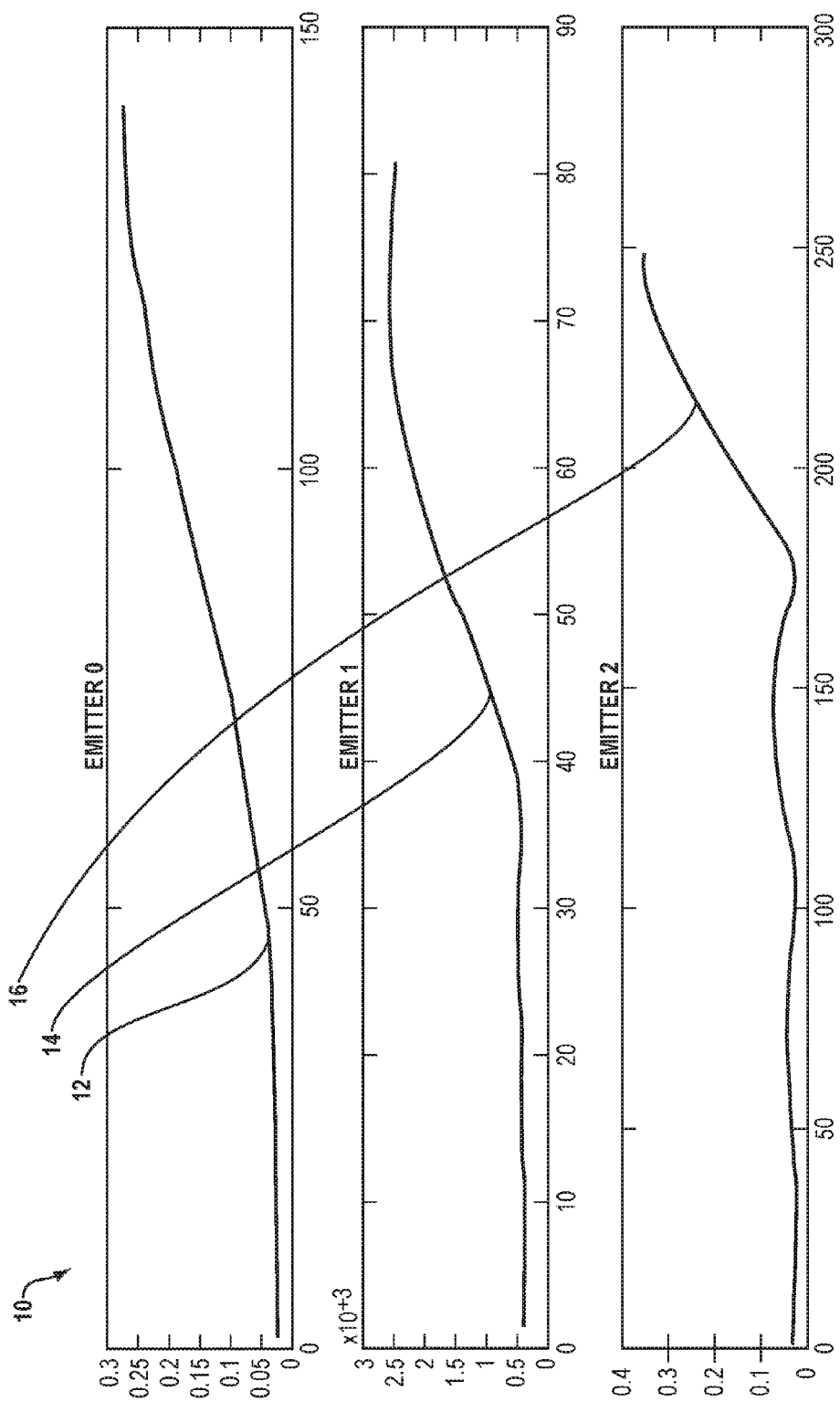
FIG. 1 depicts a graph of an example set of transients from different base station downlink transmissions.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

A particular embodiment of the method for signal emitter identification using higher-order cumulant analysis will now be described with reference to the accompanying drawings. Higher-order cumulant analysis is reference to a method that employs higher-order cumulants rather than lower-order statistics (e.g. variances) to achieve state-monitoring purposes. The method and apparatus for signal emitter identification using higher-order cumulants may, however, be embodied in many different forms and should not be construed as limited to the embodiment set forth herein; rather, this embodiment is provided so that this disclosure will be thorough and complete, and will fully convey the scope of the method for signal emitter identification using higher-order cumulants to those skilled in the art. The terminology used in the detailed description of the particular embodiment illustrated in the accompanying drawings is not intended to be limiting of the invention. In the drawings, like numbers refer to like elements.

The implementation of statistical cumulants is employed in developed techniques for features that may be used to differentiate one emitter from one or many others. Note that the proposed mechanisms are not necessarily limited to the general use and application related to RF emitters and one may also apply the technique to sonar, ultra-sound, and microwave emissions.

Unlike other SEI techniques that use only correlation-based first and second order statistics of signal parameters (e.g., amplitude, frequency, phase and duration) are sensitive to noise; cumulants greater than second order are zero for Gaussian noise. Consequently, a methodology employing higher-order cumulants (HOC) is robust to Gaussian noise and avoids the problem of needing additional variables for transient detection and RF fingerprint extraction that may be found in electronic warfare (EW), signal intelligence (SIGINT) and any commercial endeavor.

Higher-Order cumulants can describe the higher-order statistical characteristics of a random process. Cumulants are used to describe, and in some circumstances approximate, a univariate or multivariate distribution. Cumulants are blind to any kind of a Gaussian process, whereas correlation is not; hence, cumulant-based signal processing methods handle colored Gaussian measurement noise automatically, whereas correlation-based methods do not. Cumulants are also robust to the rotation and excursion of a constellation diagram.

If a received signal is $r(t)=s(t)+n(t)$ where $s(t)$ is the emitted signal and $n(t)$ is the Gaussian noise and both are independently distributed, the nature of the higher-order cumulants (HOC) is as follows, where $c[\bullet]$ is the cumulant generating function.

$$c[r(t)]=c[s(t)]+c[n(t)]=c[s(t)] \quad (1)$$

Consequently, cumulant-based methods boost signal-to-noise ratio when signals are corrupted by Gaussian measurement noise. HOC are also applicable when dealing with non-Gaussian (or, possibly, non-linear) processes, and many real-world applications are truly non-Gaussian.

Fourth-order cumulant of a zero-mean random process-vector $x \in C^{n \times 1}$ can be expressed as:

$$C_x = E\{\tilde{x}\tilde{x}^H\} - vec(R_x^*)vec^H(R_x) - R_x \otimes R_x^* \quad (2)$$

where, $$R_x \stackrel{def}{=} E\{xx^H\}$$

is the covariance matrix and $\tilde{x}=x \otimes x^*$

This cumulant matrix contains cum $$(x_i, x_j, x_k^*, x_l^*) =$$

$$E(x_i x_j x_k^* x_l^*) - E(x_i x_l^*)E(x_j x_k^*) - E(x_i x_k^*)E(x_j x_l^*) - E(x_i x_j^*)E(x_k x_l^*)$$

for all possible i, j, k, l.

The technical merit of this methodology is higher performance in detecting and fingerprinting signal emitters through the use of statistical cumulants and Bayesian detectors of abrupt step changes. Bayesian detectors quantify the distribution between information bearing signal and noise.

Data was collected for the transient state of multiple Long Term Evolution (LTE) cellular downlink emitters. Sample transient state emission waveforms are illustrated in the graph 10 of FIG. 1. A first transient waveform 12 from a first emitter is shown along with a second transient waveform 14 from a second emitter, and a third transient waveform 16 from a third emitter. Al three transient waveforms 12, 14 and 16 are different from each other and can be used to identify the particular emitter.

Figure 2:
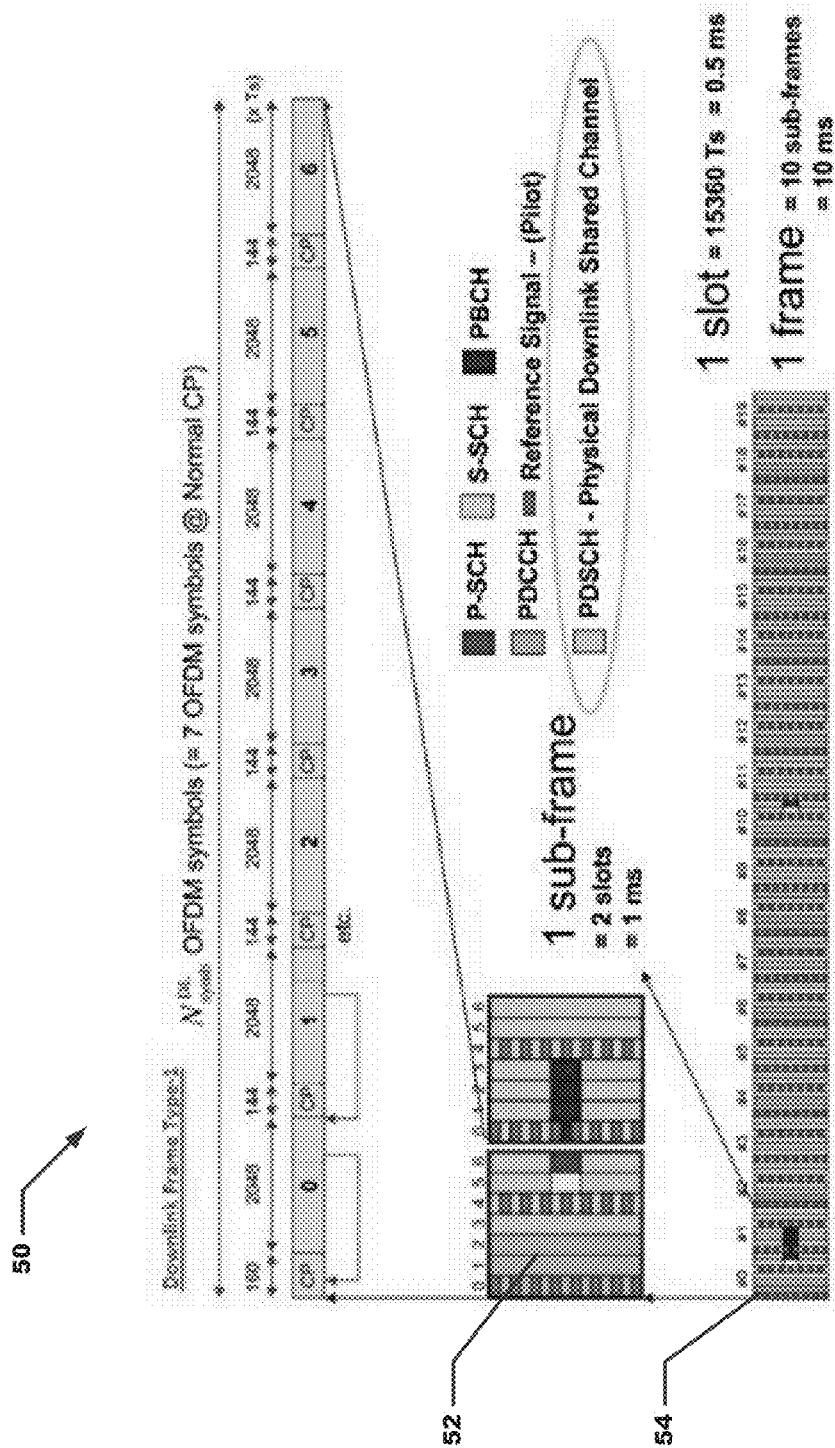
FIG. 2 depicts a diagram of a Radio Frame with associated channels.

Statistical cumulants up to fourth-order were employed to create a feature vector for multiple fielded cellular base station emitters. Higher orders may also be employed. A feature vector is a one dimensional matrix which is used to describe a feature of a signal. A feature vector can be used to describe an entire signal or a feature present at a particular location in the signal. The cumulants of the emitter's transient state emission was processed. Several channels of the OFDM downlink were processed. These channels were the Primary Synchronization Signal (PSS), Secondary Synchronization Signal (SSS), and Broadcast Channel (BCH) channels for a radio frame which appear as P-SCH, S-SCH, and PBCH in FIG. 2. FIG. 2 shows the channel 50 including the subframe 52 and the time slot 54. The PSS and SSS help determine frame timing and cell identification, and occur every five sub-frames. The BCH carries the Master Information Block (MIB). The MIB repeats every 10 sub-frames.

A duration of the transient waveform was also recorded as an additional feature vector element. A feature vector is an n-dimensional vector of numerical features that represent some object. Table 1 illustrates the feature vector for each base station's rising transient.

TABLE 1

| Base Station | Feature Vector of Base Stations | | | | |
|---|---|---|---|---|---|
| | Mean | Variance | $3^{rd}$-order cum | $4^{th}$-order cum | Duration |
| eNB1 | 0.4993 | 0.1073 | 0.0073 | −0.0170 | 1.05 nsec |
| eNB2 | 0.2534 | 0.0832 | 0.0382 | 0.0070 | 2.5 nsec |
| eNB3 | 0.5432 | 0.1111 | 0.0066 | −0.0207 | 2.5 nsec |

The values in Table 1 distinctly fingerprint the base stations from one another. Improvement in the analysis may be obtained by generating more sample points with interpolation followed by sliding a window across the data to calculate a more averaged cumulant value with each slide represented as an index (lag) for each cumulant value. A sliding window is a means of measuring a signal parameter over a certain length of the signal at predetermined intervals. The window defines a predetermined interval over which the signal will be analyzed. After an interval within a window is analyzed, the window is slid to the next interval and analysis of the signal now within the window is analyzed. If insufficient samples have been obtained to represent the transient, interpolation can be used to obtain more.

The energy transient trajectory is an aggregate of three sections. The first is noise only, the second is the turn-on of the emitter generating a rising transient plus noise and the third is the envelope plus noise.

A sliding window is used to take samples of the transient waveforms in order to preform transient acquisition. The point in time at which the rising transient begins within the sliding window is denoted as m. This is the start point (change point) of transient extraction. Transient signal acquisition is obtained first by passing the signal through a sliding window. The shape of the widow may vary and is determined by the amount of weighted overlap of the next window containing data. The window size in terms of the number of samples is pre-determined. The window is slid one sample at a time and the different HOCs are calculated at each time step. A method is required to determine the start and end points of the transient.

The change point can be calculated by the ratio of the HOC energy at each sample point to the accumulated HOC energy within the window over all sliding points within the window's width, $L_w$:

$$m = \frac{\sum_{n=i}^{i+Lw-1} C_x^2(n)}{\left(\sum_{n=i}^{i+Lw-1} C_x(n)\right)^2} \quad 1 \leq i \leq N - L_w \quad (3)$$

This gives a measure of the relative smoothness enclosed by the sliding window and is equivalent to Hotelling's T-squared detection against a defined threshold. A maximum value for the change point is determined. Due to the use of a sliding window and the ad hoc nature of equation (3), the change point should start slightly before the index value for m.

A Bayesian Step Change detector is used to detect the change point before the maximum. Typical transmission data contains ambient channel noise followed by the start of a radio transmission. Data samples form a piecewise signal with added Gaussian noise, which can be modeled as:

$$d_i = \begin{cases} \mu_1 + e_i & \text{if } 1 \leq i < m \\ \mu_2 + e_i & \text{if } m \leq i \leq N \end{cases}, \quad (4)$$

where $d_i$ is the piecewise data sample at time instant i, N is the number of data points, m is the change point at sample time i, $\mu_1$ and $\mu_2$ are nuisance parameters (means of noise only segment) and transient segment respectively, and $e_i$ are the noise samples. The model assumes a linear increase in the power level of the radio during start-up.

The likelihood of the data is given by the joint probability of the noise samples.

$$p(d | \{\mu_1, \mu_2, \sigma, m\}, I) = \prod_{i=1}^{N} p(e_i) \quad (5)$$

where $\sigma$ is the standard deviation of the Gaussian noise, $\{\mu_1, \mu_2, \sigma, m\}$ denotes various assumed values of the signal parameters and I denotes prior information, or any assumptions which led to this particular choice of signal model. The key advantage of the Bayesian Step Change detector is that it could be applied to signals without prior knowledge of their specific characteristics.

Using the Bayesian approach (similar to the Hinckley test), it can be shown that the detector is:

$$p(\{m\} | d, I) \propto \frac{1}{\sqrt{m(N-m)}} \left[\sum_{i=1}^{N} d_i^2 - \frac{1}{m}\xi_l^2 - \frac{1}{N-m}\xi_r^2\right]^{-\left(\frac{N-2}{2}\right)} \quad (6)$$

where $$\xi_l = \sum_{i=1}^{m} d_i \text{ and } \xi_r = \sum_{i=m+1}^{N} d_i.$$

The features of the transient are used to form the overall RF fingerprint. Polynomial fitting using least squares is used to extract the features from the transient. The polynomial can be expressed as $$y = f(x, p) \quad (7)$$

A possible representation is:

$$y(x) = p_0 + p_1 x + p_2 x^2 + \ldots + p_n x^n \quad (8)$$

Consequently, a minimization procedure is required to solve a least-squares problem provided the appropriate objective function is constructed. The procedure here is fairly typical where it is desired to fit a set of data $\{x_i, y_i\}$ to a known model as in equation (7) where p is a vector of parameters for the model that need to be found based on the set of data $\{x_i, y_i\}$. A common method for determining which parameter vector gives the best fit to the data is to minimize the sum of squares of the residuals. The residual is usually defined for each observed data point as $$e_i(p, y_i, x_i) = \|y_i - f(x_i, p)\| \quad (9)$$

Thus, the residual for this is:

$$e_i(p, y_i, x_i) = \|C_x(x_i) - f(x_i, p)\| \quad (10)$$

An objective function to pass to any of the previous minimization algorithms to obtain a least-squares fit is the minimum mean-square-error (MSE):

$$\min_p J(p) = \min_p \sum_{i=0}^{N-1} e_i^2(p) \quad (11)$$

An algorithm to accomplish the minimization of the objective function to obtain the optimized parameter vector is the Levenberg-Marquardt algorithm. Other least square methods may be used for obtaining the vector of parameters.

The order of n is determined by the actual situation. The feature vector used for RF fingerprinting is now $[p_0, p_1, p_2, \ldots, p_n, d]^T$ where d is the duration time as in Table I.

Figure 3:
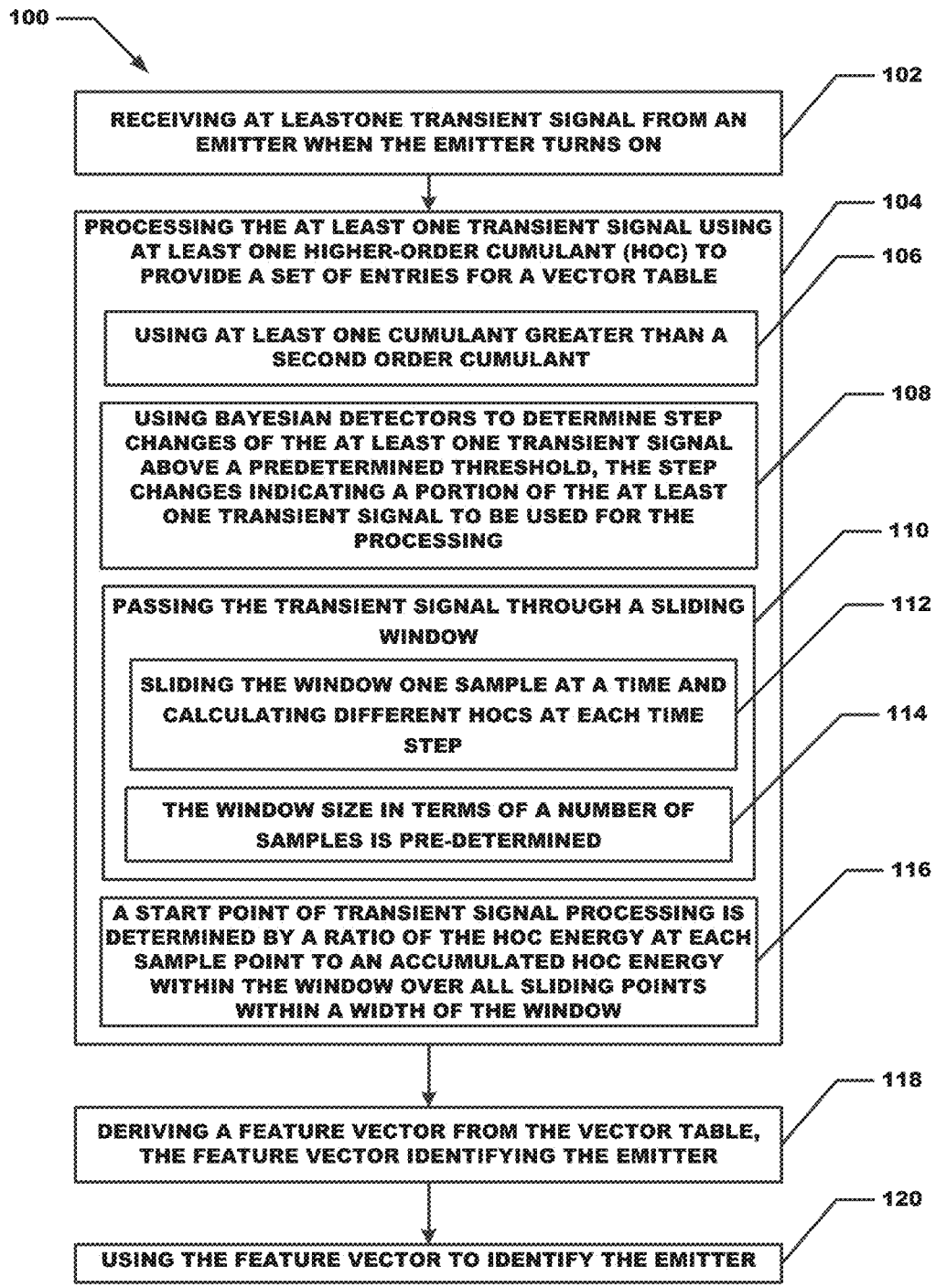
FIG. 3 depicts a flow diagram of a particular embodiment of a method for signal emitter identification using higher-order cumulants.

A flow diagram of a particular embodiment of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language or hardware implementation. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 100 for signal emitter identification using Higher-Order Cumulants (HOC) is shown. Method 100 begins with processing block 102 which discloses receiving at least one transient signal from an emitter when the emitter turns on. When an emitter turns on, the signal goes through a transient state. The transient is caused by a combination of electronic physical effects. These effects are all different to some degree between emitters due to non-conformity of the electronic hardware.

Processing block 104 states processing the at least one transient signal using at least one Higher-Order Cumulant (HOC) to provide a set of entries for a vector table. As shown in processing block 106 the using at least one HOC comprises using at least one cumulant greater than a second order cumulant. A methodology employing higher-order cumulants (HOC) is robust to Gaussian noise and avoids the problem of needing additional variables for transient detection.

Processing block 108 recites wherein the processing the at least one transient signal includes using Bayesian detectors to determine step changes of the at least one transient signal above a predetermined threshold, the step changes indicating a portion of the at least one transient signal to be used for the processing. In this manner only the portion of the transient signal that is useful for emitter identification is utilized.

Processing block 110 discloses wherein the processing the at least one transient signal includes passing the transient signal through a sliding window. As shown in processing block 112 the passing the transient signal through a sliding window comprises sliding the window one sample at a time and calculating different HOCs at each time step. As further shown in processing block 114 the window size in terms of a number of samples is pre-determined. Processing block 116 states a start point of transient signal processing is determined by a ratio of the HOC energy at each sample point to an accumulated HOC energy within the window over all sliding points within a width of the window.

Processing continues with processing block 118 which discloses deriving a feature vector from the vector table, the feature vector identifying the emitter. Each emitter will have a particular feature vector. Processing block 120 states using the feature vector to identify the emitter.

Figure 4:
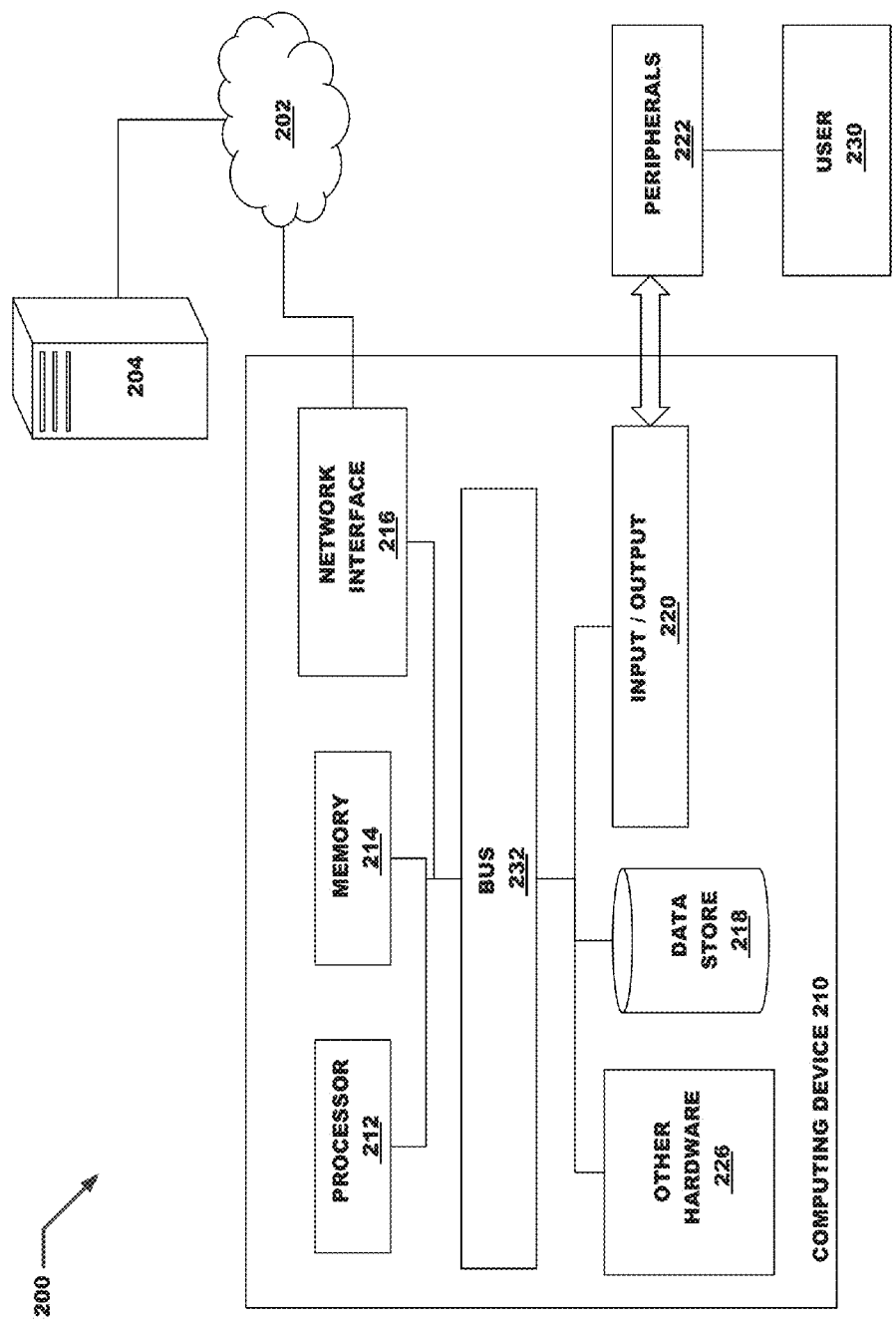
FIG. 4 depicts a block diagram of a computer system for signal emitter identification using higher-order cumulants in accordance with embodiments of the invention.

Referring now to FIG. 4 a computer system 200 for performing signal emitter identification using Higher-Order Cumulants (HOC) is shown. In general, the computer system 200 may include a computing device 210 connected to a network 202, e.g., through an external device 204. The computing device 210 may be or include any type of network endpoint or endpoints as described herein. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may include a processor 212, a memory 214, a network interface 216, a data store 218, and one or more input/output devices 220. The computing device 210 may further include or be in communication with peripherals 222.

The processor 212 is capable of processing instructions for execution within the computing device 210 or computer system 200. The processor 212 may include a single-threaded processor or a multi-threaded processor. The processor 212 may be capable of processing instructions stored in the memory 214 or on the data store 218.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in FIG. 4, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Having described preferred embodiments of the invention it will now become apparent to those of ordinary skill in the art that other embodiments incorporating these concepts may be used.

What is claimed is:

1. A method comprising:
receiving at least one transient signal from an emitter when said emitter turns on;
processing said at least one transient signal using at least one Higher-Order Cumulant (HOC) to provide a set of entries for a vector table;
deriving a feature vector from said vector table, said feature vector identifying said emitter; and
using said feature vector to identify said emitter.

2. The method of claim 1 wherein said using at least one HOC comprises using at least one cumulant greater than a second order cumulant.

3. The method of claim 1 wherein said processing said at least one transient signal includes using Bayesian detectors to determine step changes of said at least one transient signal above a predetermined threshold, said step changes indicating a portion of said at least one transient signal to be used for said processing.

4. The method of claim 3 wherein said processing said at least one transient signal includes passing said transient signal through a sliding window.

5. The method of claim 4 wherein said passing said transient signal through a sliding window comprises sliding said window one sample at a time and calculating different HOCs at each time step.

6. The method of claim 5 wherein said window size in terms of a number of samples is pre-determined.

7. The method of claim 6 wherein a start point of transient signal processing is determined by a ratio of said HOC energy at each sample point to an accumulated HOC energy within the window over all sliding points within a width of said window.

8. A non-transitory computer readable storage medium having computer readable code thereon for signal emitter identification using Higher-Order Cumulants (HOC), the medium including instructions executable by one or more processors to perform operations, comprising:
   receiving at least one transient signal from an emitter when said emitter turns on;
   processing said at least one transient signal using at least one HOC to provide a set of entries for a vector table;
   deriving a feature vector from said vector table, said feature vector identifying said emitter; and
   using said feature vector to identify said emitter.

9. The non-transitory computer readable storage medium of claim 8 wherein said instructions for using at least one HOC comprises instructions for using at least one cumulant greater than a second order cumulant.

10. The non-transitory computer readable storage medium of claim 8 wherein said instructions for processing said at least one transient signal includes instructions for using Bayesian detectors to determine step changes of said at least one transient signal above a predetermined threshold, said step changes indicating a portion of said at least one transient signal to be used for said processing.

11. The non-transitory computer readable storage medium of claim 10 wherein said instructions for processing said at least one transient signal includes instructions for passing said transient signal through a sliding window.

12. The non-transitory computer readable storage medium of claim 11 wherein said instructions for passing said transient signal through a sliding window comprises instructions for sliding said window one sample at a time and calculating different HOCs at each time step.

13. The non-transitory computer readable storage medium of claim 12 wherein said instructions include instructions for a window size in terms of a number of samples is pre-determined.

14. The non-transitory computer readable storage medium of claim 13 wherein instructions include instructions wherein a start point of transient signal processing is determined by a ratio of said HOC energy at each sample point to an accumulated HOC energy within the window over all sliding points within a width of said window.

15. A computer system comprising:
   a memory;
   a processor;
   a communications interface;
   an interconnection mechanism coupling the memory, the processor and the communications interface; and
   wherein the memory is encoded with an application providing signal emitter identification using Higher-Order Cumulants (HOC), that when performed on the processor, provides a process for processing information, the process causing the computer system to perform the operations of:
   receiving at least one transient signal from an emitter when said emitter turns on;
   processing said at least one transient signal using at least one HOC to provide a set of entries for a vector table;
   deriving a feature vector from said vector table, said feature vector identifying said emitter; and
   using said feature vector to identify said emitter.

16. The computer system of claim 15 wherein said using at least one HOC comprises using at least one cumulant greater than a second order cumulant.

17. The computer system of claim 15 wherein said processing said at least one transient signal includes using Bayesian detectors to determine step changes of said at least one transient signal above a predetermined threshold, said step changes indicating a portion of said at least one transient signal to be used for said processing.

18. The computer system of claim 17 wherein said processing said at least one transient signal includes passing said transient signal through a sliding window.

19. The computer system of claim 18 wherein said passing said transient signal through a sliding window comprises sliding said window one sample at a time and calculating different HOCs at each time step.

20. The computer system of claim 19 wherein said window size in terms of a number of samples is pre-determined and wherein a start point of transient signal processing is determined by a ratio of said HOC energy at each sample point to an accumulated HOC energy within the window over all sliding points within a width of said window.

* * * * *